United States Patent
Kronenberg et al.

[11] Patent Number: 6,012,009
[45] Date of Patent: Jan. 4, 2000

[54] SYSTEM FOR DETERMINING THE GEAR RATIO CHANGES FOR AN AUTOMATIC TRANSMISSION

[75] Inventors: Klemens Kronenberg, Oberriexingen; Marko Poljansek, Reutlingen, both of Germany

[73] Assignee: Robert Bosch GmbH, Stuttgart, Germany

[21] Appl. No.: 08/824,784

[22] Filed: Mar. 26, 1997

[30] Foreign Application Priority Data

Mar. 26, 1996 [DE] Germany ............... 196 11 840

[51] Int. Cl.[7] ............... G06F 17/00; F16H 61/02
[52] U.S. Cl. ............... 701/56; 701/58; 477/905
[58] Field of Search ............... 701/51, 55, 56, 701/58; 477/905, 154, 155

[56] References Cited

U.S. PATENT DOCUMENTS

| | | | |
|---|---|---|---|
| 5,069,084 | 12/1991 | Matsuno et al. | 477/61 |
| 5,157,609 | 10/1992 | Stehle et al. | 701/56 |
| 5,688,207 | 11/1997 | Uchida et al. | 477/155 |
| 5,878,364 | 3/1999 | Kuroda et al. | 701/56 |

FOREIGN PATENT DOCUMENTS

| | | |
|---|---|---|
| 0583610 | 2/1994 | European Pat. Off. . |
| 2034422 | 6/1980 | United Kingdom . |

OTHER PUBLICATIONS

"Die Adaptive Getriebesteuerung für die Automatikgetriebe der BMW Fahrzeuge mit Zwölfzylindermotor" by A. Welter et al, ATZ Automobiltechnische.

"Die Adaptive Getriebesteuerung fur BMW–Automobile" by A. Welter et al, ATZ Automobiltechnische Zeitschrift 95 (1993) 9, pp. 420 to 434.

Primary Examiner—William A. Cuchlinski, Jr.
Assistant Examiner—Edward Pipala
Attorney, Agent, or Firm—Walter Ottesen

[57] ABSTRACT

The invention proceeds from a system for determining the changes in gear ratio for an automatic transmission of a vehicle. In the system, at least two different pregiven associations (shift programs) are selected in dependence upon the detected vehicle speed and the detected accelerator pedal position. The selection of these associations (shift program) takes place with the aid of a specific adaptation quantity. The essence of the invention is in the determination of this adaptation quantity and therefore in the selection of the different shift programs. According to the invention, the selection of the associations or shift programs takes place in such a manner that one of the two associations is set as the base adjustment, that is, as the base shift program. The other association, or in the case of several alternative associations, the other associations are set for only a specific time duration. After this time duration has elapsed, the system of the invention automatically returns to the base setting.

14 Claims, 8 Drawing Sheets

| B/α' | 100%/sec | 500%/sec | . . . . |
|---|---|---|---|
| 1 | 0 sec | 0 sec | . . . . |
| 2 | 60 sec | 200 sec | . . . . |
| 3 | 100 sec | 400 sec | . . . . |

SYSTEM FOR DETERMINING THE GEAR RATIO CHANGES FOR AN AUTOMATIC TRANSMISSION

BACKGROUND OF THE INVENTION

In motor vehicle transmissions wherein the gear ratio is automatically adjustable, it is conventional to effect the shifting operations of the automatic transmission in dependence upon the accelerator pedal actuated by the driver as well as in dependence upon the vehicle longitudinal speed. The gear ratio changes of the automatic transmission are determined dependent upon the above-mentioned variables, mostly via shift characteristic fields. It is furthermore known to provide so-called adaptive transmission controls in order to improve adaptation of the shift operations of the automatic transmission to the driver command as well as to the environmental conditions and the particular driving situation which is then present. There are several shift strategies for such adaptive transmission controls and most are realized with different shift characteristic fields. In total, a relatively good shift strategy can be realized by selecting the different strategies or characteristic fields in dependence upon the detected type of driver and/or on the detected environmental conditions which the vehicle is subjected to at the particular time. Such adaptive transmission controls are, for example, known from U.S. Pat. No. 5,157,609 and publication "ATZ Automobiltechnische Zeitschrift" 94 (1992) 9, starting at page 428 and from the publication "ATZ Automobiltechnische Zeitschrift" 95 (1993) 9, starting at page 420. Such adaptive transmission control systems are, however, relatively complex to realize.

In addition to the above-mentioned automatically adapting transmission control systems, it is furthermore known to achieve an adaptation of the shift strategy in that the driver can, with the actuation of a program switch, select, for example, between a consumption-optimized program, a power-oriented program and a winter driving program.

SUMMARY OF THE INVENTION

It is an object of the invention to provide a self-adapting transmission control system in a simple manner.

The system of the invention is for determining gear ratio changes for an automatic transmission of a vehicle. The system includes: first detecting means for providing a first signal (V) representative of the road speed of the vehicle; second detecting means for providing a second signal ($\alpha$) representing the position of the accelerator pedal actuated by the driver; means for determining the gear ratio changes at least in dependence upon the first and second signals (V, $\alpha$) in such a manner that a selection can be made between a first association defining a base setting and at least one additional association which can be set for only a specific time duration (T); and, means for determining an adaptation quantity (BZ) via which the selection of one of the associations can be determined.

As mentioned, the invention proceeds from a system for determining the gear ratio changes for an automatic transmission of a motor vehicle wherein detection means are provided for detecting a first signal, which represents the vehicle road speed, and a second signal, which represents the position of the accelerator pedal actuated by the driver. Furthermore, determination means are provided for determining the changes of the gear ratio of the automatic transmission. The determination is at least dependent upon the detected first and second signals in such a manner that at least two different pregiven shift programs can be selected between the gear ratio changes and the detected first and second signals. The selection of this shift program takes place by means of a specific adaptation variable.

The essence of the invention is the determination of this adaptation variable and therefore the selection of the different shift programs. According to the invention, the selection of the shift programs takes place in such a manner that one of the shift programs is adjusted as a base setting, that is, as a base shift program. The other shift program or, in the case of several alternative shift programs, the other shift programs are only adjusted for a specific time duration. After the elapse of this time duration, the system returns automatically to the base setting.

With the system according to the invention, an adaptive transmission control is achieved in a relatively simple manner. The simplicity of the system of the invention is evident especially in a reduced memory requirement in the computer and, on the other hand, to a relatively simple adaptation to the different vehicles. The system of the invention is easily mastered and is cost effective. The invention affords a possibility to do without the program switch and the adaptation can be carried out automatically. This is so especially for vehicles with automatic transmissions which have previously been equipped with the above-mentioned program switch.

In an advantageous embodiment of the invention, the time duration is determined during which the shift strategy, which departs from the base setting, remains adjusted at least in dependence upon the rate of change of the detected second signal. This means that a specific accelerator pedal change must be present in order to leave the basic shift program. The length of time that the base setting is vacated is likewise made dependent upon the rate of change of the accelerator pedal position. This configuration is provided especially with the view to an adaptation of the shift operations of the automatic transmission to different driver types. If one assumes that the base setting is a fuel-consumption optimized shift program, the system of the invention reacts to a higher rate of change of the accelerator pedal position in such a manner that a more power-oriented shift program is set for a specific time duration.

In an another advantageous embodiment of the invention, it is provided that the time duration during which the base shift program is vacated, is at least dependent upon the accelerator pedal position. In this embodiment of the invention, leaving the base position is made dependent upon whether the driver actuates the accelerator pedal rather in the lower position range, in the mid position range or in the upper position range. In a variant of the embodiment, one obtains a still better adaptation to the type of driver especially with the combination of the first variant (consideration of the rate of change of the accelerator pedal).

It is furthermore provided that the time duration, during which the base position is vacated, is at least dependent upon the change of the accelerator pedal position. This means that, for a change of the shift strategy, consideration is given as to whether the accelerator pedal position changes, for example, from a lower position range into a mid position range or into an upper position range. Accelerator pedal changes within a specific accelerator pedal range (even when they take place with high speed) therefore lead to no movement out of the base setting. As already mentioned, the accelerator pedal positions, which are adjustable via the accelerator pedal, can be subdivided into individual ranges. The time duration, during which a movement out of the base shift program takes place, is determined in dependence upon at least that range in which the position of the accelerator pedal is then located. Furthermore, the time duration can be made dependent upon whether the accelerator pedal position has changed in such a manner that a change of range is detected.

In a further embodiment of the invention, it is provided that the time duration during which the base position is vacated, is determined at least in dependence upon the detected vehicle longitudinal speed. For this purpose, and to distinguish a start-drive state or a travel-operation state, the detected vehicle longitudinal speed is compared to a threshold value. The time duration, during which the base setting is vacated, can be determined differently depending upon the start-drive state or the travel-operation state. To distinguish whether a start-drive state or a travel-operation state is present, the accelerator pedal position can be applied in addition to the vehicle longitudinal speed. This distinction has the background that an adaptation of the transmission control should take place already during the start-drive operation. A start-drive operation with a greatly depressed accelerator pedal permits a conclusion to be drawn that a high propulsion command of the driver is present and therefore the command for a motor-power oriented shift program. If the start-drive operation is present with only a slightly depressed accelerator pedal, then the fuel-consumption optimized base setting can be retained. Differently long times, during which the base adjustment is vacated, are determined in dependence upon the rate of change and the position of the accelerator pedal during the start-drive operation.

If more than two shift programs are provided, then the determined time durations during the start-drive state and during the subsequent travel-operation state are compared to each other in order to select one of the alternatives to the basic shift program.

In summary, a fuel-consumption optimized transmission gear ratio program is set as the base setting in the system of the invention. A switchover to a more propulsion-power optimized transmission gear ratio program takes place only for a specific time duration. The switchover and the time duration are, on the one hand, dependent upon the rate of change of the accelerator pedal and, on the other hand, dependent upon the total change of the accelerator pedal position.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
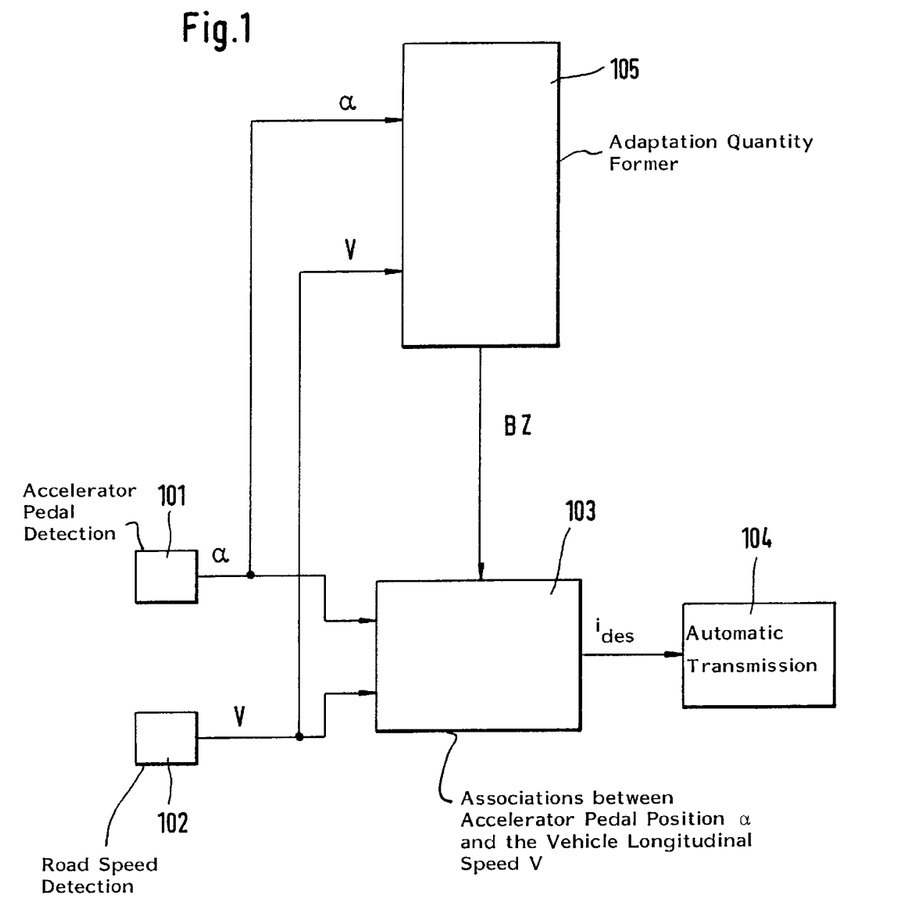
FIG. 1 is an overview block circuit diagram of an adaptive transmission control.

FIG. 1 shows an overview block circuit diagram of an adaptive transmission control. Block 103 contains different shift programs and the following signals are supplied thereto: the output signal of the accelerator pedal detection 101, the accelerator pedal position $\alpha$, and the output signal of the road speed detection 102 (the vehicle longitudinal speed V). As mentioned above, different associations are provided in block 103 between the accelerator pedal position $\alpha$ and the vehicle longitudinal speed V to the transmission desired gear ratio $i_{des}$. This realization can, for example, be effected with different shift characteristic fields or by coordinate transformations. The transmission desired gear ratio $i_{des}$ obtained in this manner is supplied to the automatic transmission 104. The different associations or the different shift programs are set by the adaptation quantity BZ. The adaptation quantity BZ is determined in block 105 utilizing the accelerator pedal position $\alpha$ and the vehicle longitudinal speed V. The essence of the invention is realized in block 105.

Figure 2:
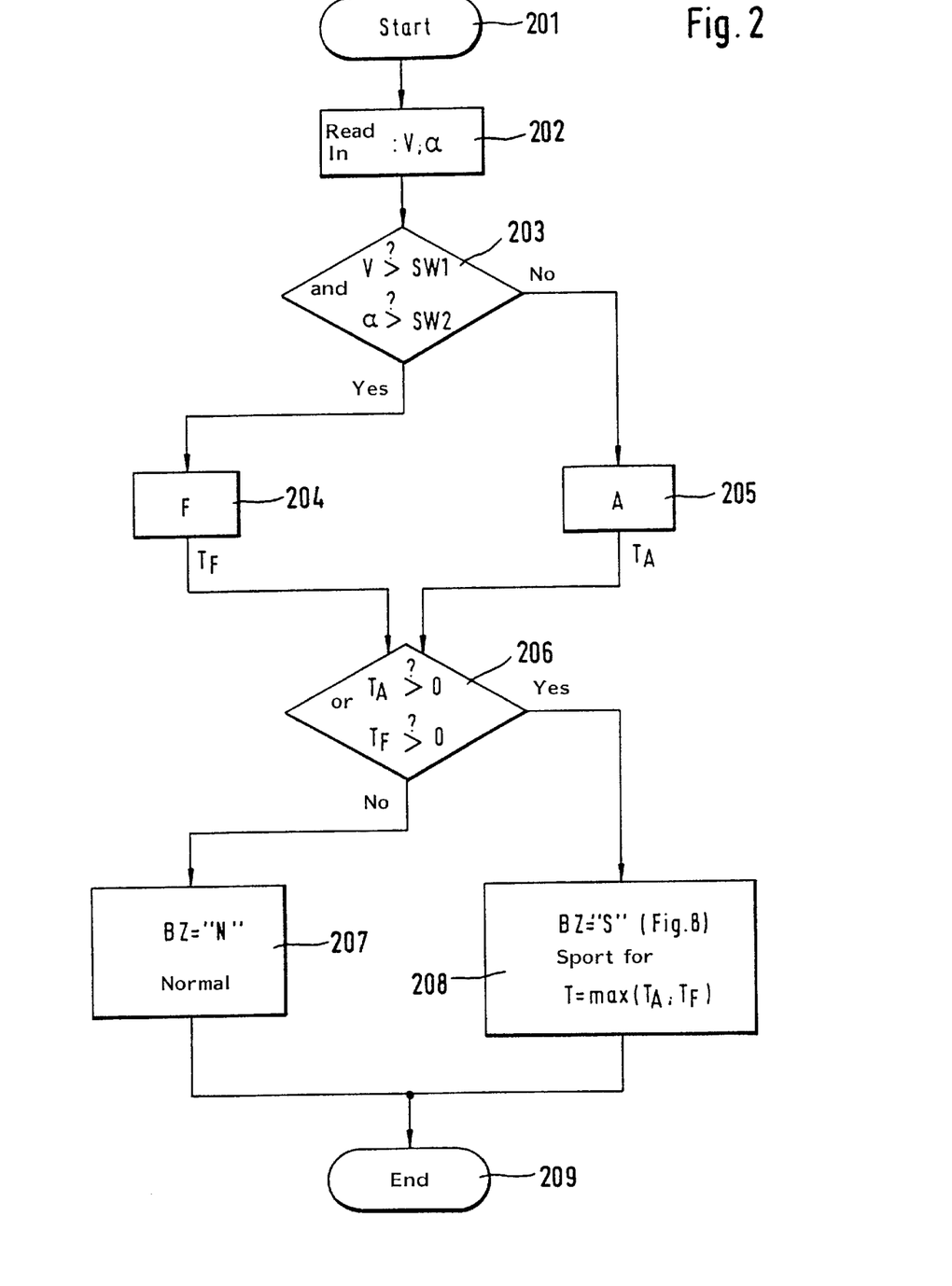
FIG. 2 is a sequence diagram which shows the operation of block 105 according to a first embodiment of the invention.

FIG. 2 shows the operation of block 105 in accordance with this embodiment. After the start step 201, the vehicle longitudinal speed V and the accelerator pedal position $\alpha$ are read in in step 202. In step 203, the vehicle longitudinal speed and the accelerator pedal position are compared to respective threshold values SW1 and SW2. The threshold values SW1 and SW2 are selected so as to be relatively low and are especially determined to be zero. If it is determined in step 203 that the vehicle longitudinal speed as well as the accelerator pedal position exhibit essentially the value zero, then, in step 205, the start-drive evaluation is begun. If it is determined in step 203 that the travel speed and the accelerator pedal position deviate significantly from zero, then, in step 204, the travel-operation evaluation F is started. Two time durations TF and $T_A$ are present as the output result of the travel-operation evaluation 204 and the start-drive evaluation 205, respectively. The function of the start-drive evaluation and the travel-operation evaluation is explained with respect to FIGS. 3 and 4, respectively.

In step 206, a check is made as to whether one of the two time durations deviates from zero. If this is the case, then the adaptation quantity BZ can be changed in step 208 so that in block 103 of FIG. 1, a switchover from the base shift program to the power-oriented shift program can take place. The duration of this switchover is determined by the maximum of the values $T_A$ and $T_F$. If the step 206 supplies the result that both time durations are zero, then, in step 207, the adaptation quantity BZ is selected such that the base shift program remains set in step 103. After end step 209, the passthrough shown in FIG. 2 is started again.

Figure 3:
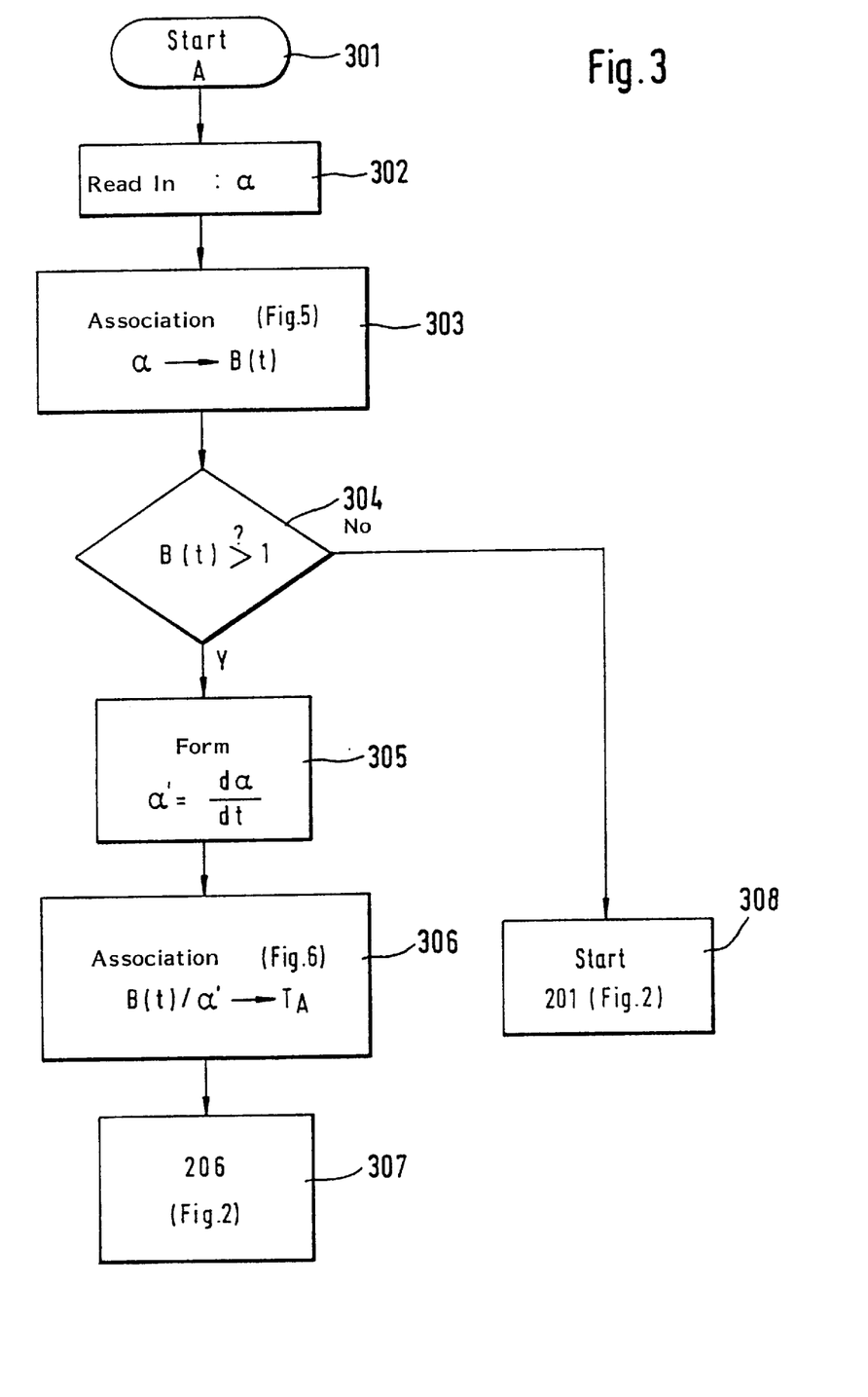
FIG. 3 shows a sequence diagram for the start-drive evaluation in block 205 of FIG. 2.

FIG. 3 shows an embodiment for the start-drive evaluation (block 205 in FIG. 2). After the start step 301, the actual position $\alpha$ of the accelerator is read in in step 302. In step 303, a specific range value B(t) is assigned to this position $\alpha$ of the accelerator pedal. This association will be explained with respect to FIG. 5.

Figure 5:
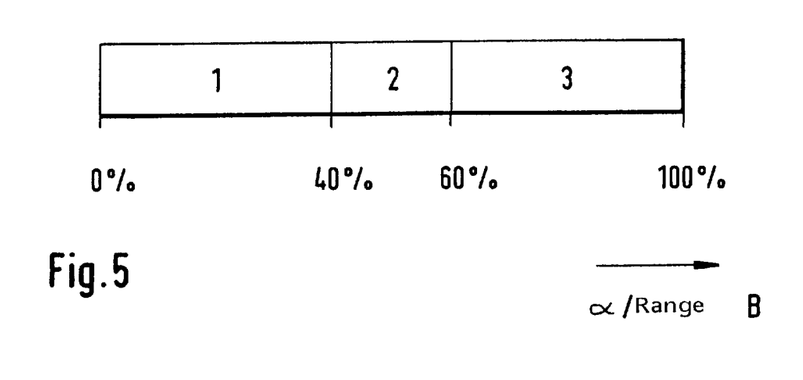
FIG. 5 is a diagram showing the entire position range of the accelerator pedal subdivided into three ranges.

In FIG. 5, the entire position range of the accelerator pedal from 0% to 100% is subdivided into three ranges. The first range extends from the accelerator pedal position zero to the accelerator position which amounts to 40% of the complete excursion. A second range extends up to 60%; whereas, the third range extends up to the full extent 100%. If, for example, the actual accelerator pedal position is 30%, then this position is assigned to range B=1.

Returning to FIG. 3, for the start-drive evaluation, the range value B(t) corresponding to the actual accelerator pedal position is checked in step 304 as to whether it lies in the lowest range (in this example 1). If this is not the case, this means that the driver has moved the accelerator pedal only insignificantly. In this case, and with step 308, a crossover to the start 201 (FIG. 2) is made. However, if it is determined in step 304 that the accelerator pedal has moved out of its zero position into a higher range, then, in step 305, the rate of change α' is formed. In step 306, a time duration $T_A$ is formed from the formed rate of change of the accelerator pedal position (step 305) and the actual position range B(t) (step 303). With respect to this formation, reference is now made to FIG. 6.

Figure 6:
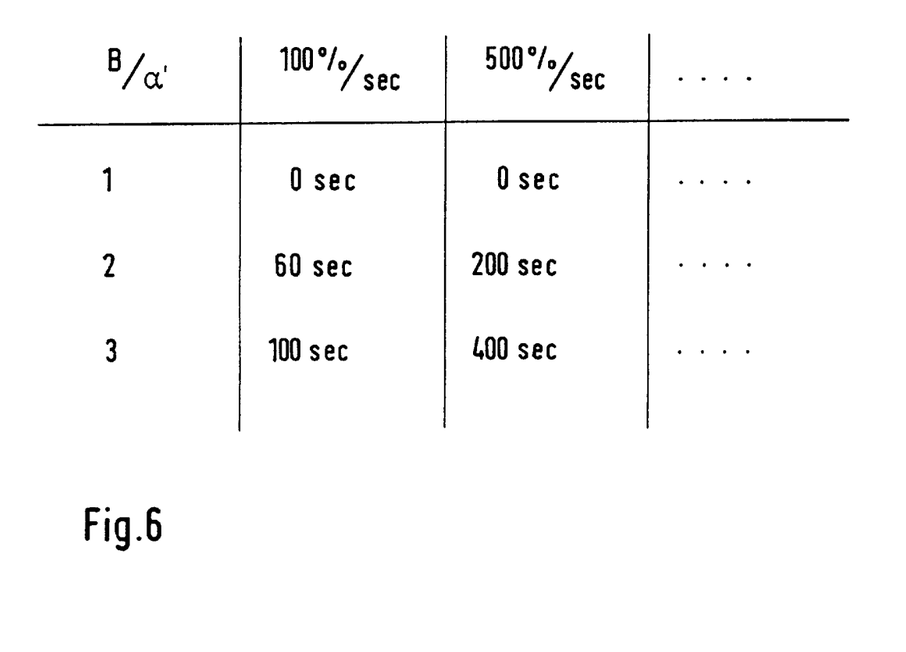
FIG. 6 shows a characteristic field for determining time values in dependence upon the detected accelerator pedal position range and in dependence upon the detected accelerator pedal position change.

FIG. 6 shows a characteristic field from which time values are determined in dependence upon the detected accelerator pedal position range (in this embodiment, ranges 1, 2 and 3) and in dependence upon the detected accelerator pedal position change. If, for example, the position of the accelerator pedal is in the mid position range 2 and the rate of change of the accelerator pedal is, for example, 500% per second, then $T_A$=200 seconds is read out as a time value.

Returning to FIG. 3, a time value $T_A$ is determined in the unit 306 and is supplied to method step 206 shown in FIG. 2.

Figure 4:
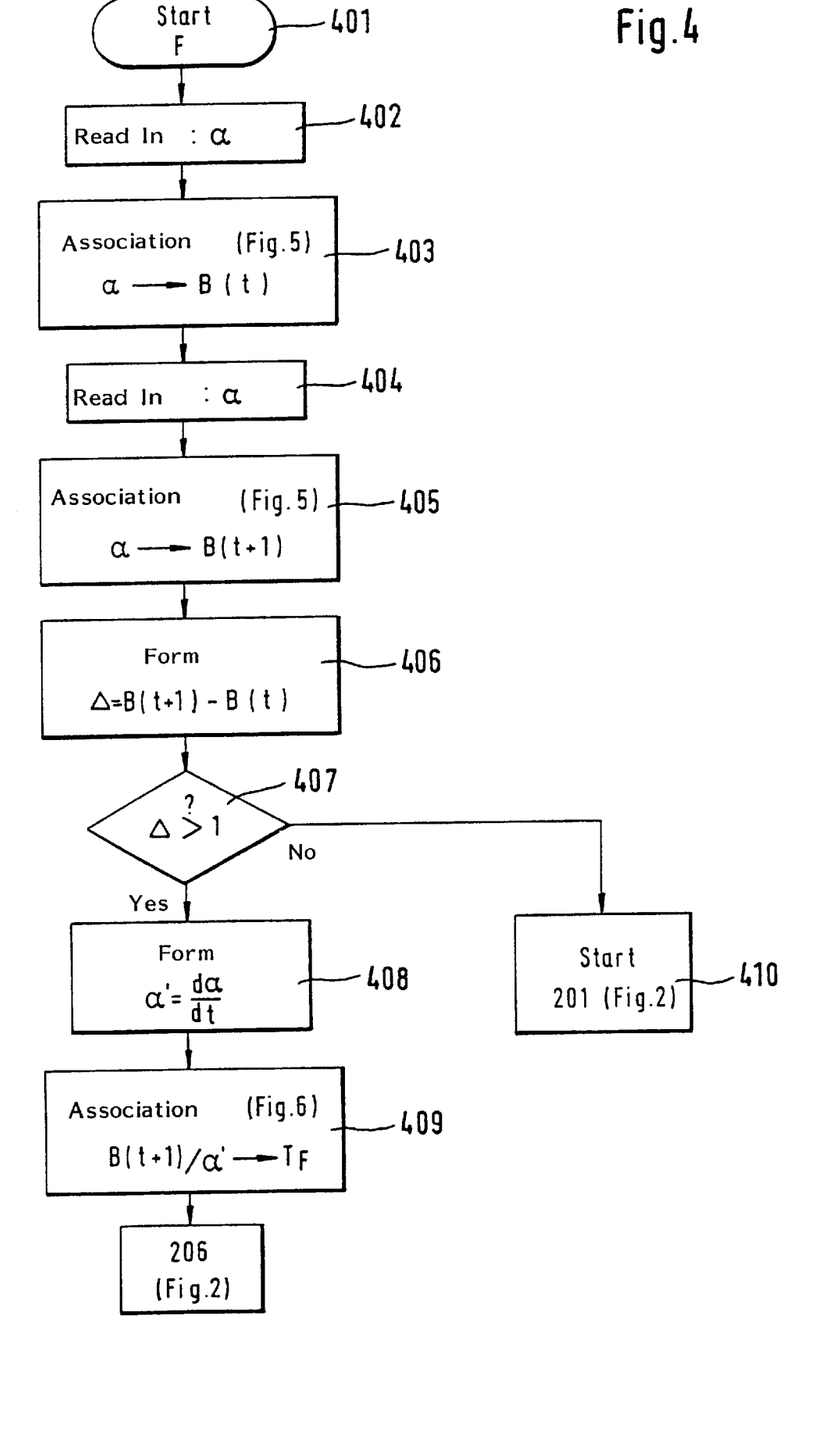
FIG. 4 shows a sequence diagram for travel-operation evaluation block 204 of FIG. 2.

The travel-operation evaluation (step 204 in FIG. 2) is explained in greater detail with respect to FIG. 4. After the start 401, the actual position value α of the accelerator pedal is read in in step 402. In step 403, the already described association (FIG. 5) takes place which assigns a range value B(t) to the detected accelerator pedal position α. In the time-dependent next step 404, the then applicable accelerator pedal position α is read in in order to also assign a range value B(t+1) to this accelerator pedal position a in step 405.

In step 406, the difference Δ between the range values is formed. If, in step 407, it is determined that this range difference Δ is greater than 1, then this means that the position of the accelerator pedal has changed from one range into another during the travel-operation evaluation. Thereupon, in step 408, the rate of change α' of the accelerator pedal position is formed. In step 409, a time duration $T_F$ is assigned to the actual range value and the actual rate of change in a manner already described with respect to FIG. 6. This is done in order to supply this time duration $T_F$ to the method step 206 (FIG. 2). If it is determined in step 407 that no range change has taken place (range difference Δ<1), then the sequence shown in FIG. 2 is started anew (step 410).

Figure 9:
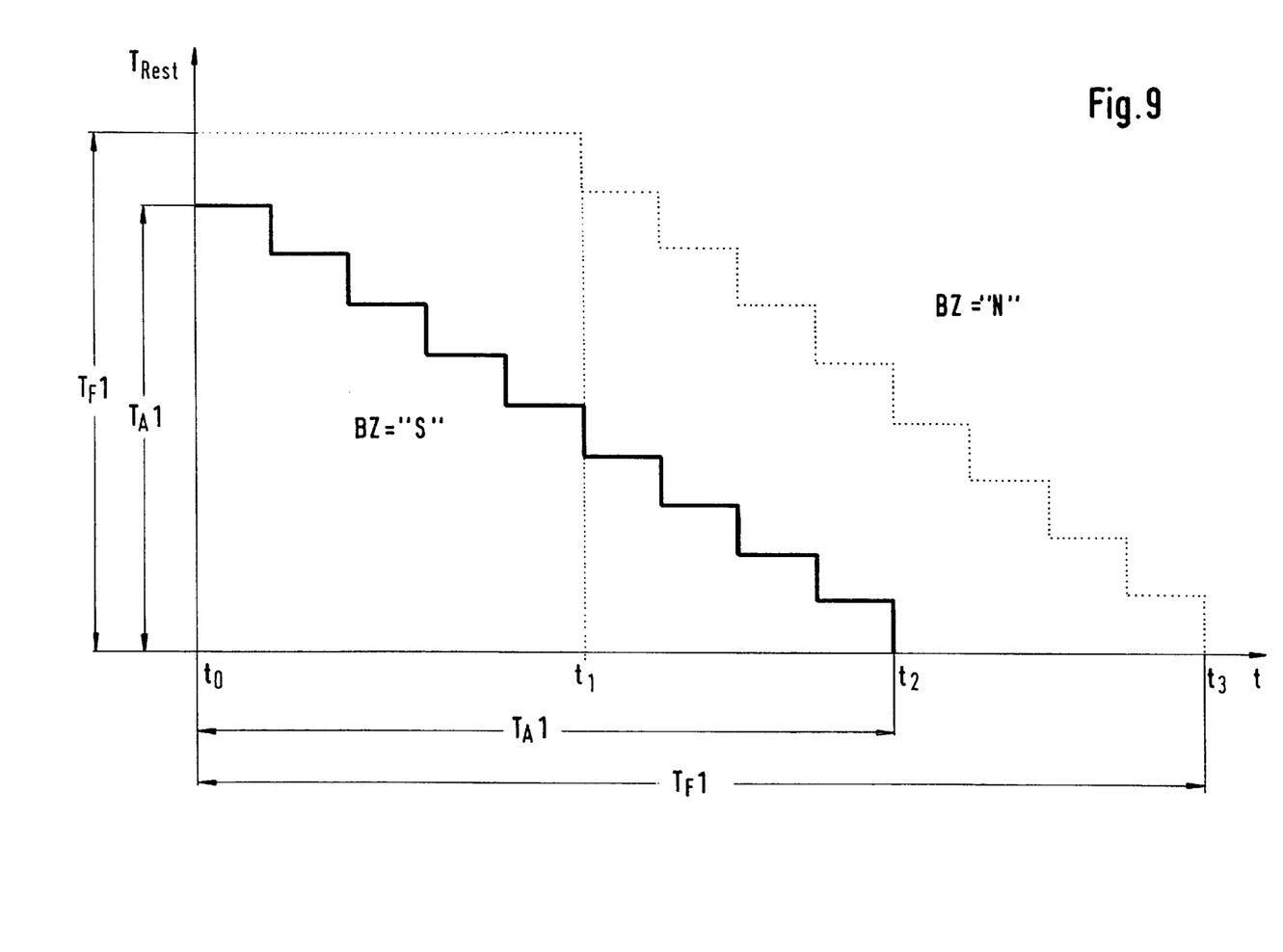
FIG. 9 shows a time-dependent trace for the switchover from the base shift program to the power-optimized travel program.

In FIG. 9, an example of such a switchover from the base shift program (adaptation quantity BZ=N) to the power-optimized travel program (adaptation quantity BZ=S) is shown. Here, the time duration $T_{Rest}$ is plotted as a function of time. The time duration $T_{Rest}$ means the time during which the power-optimized shift program is still set. At time point $t_0$, the start-drive operation of the vehicle has taken place. With the start-drive evaluation (FIGS. 2 and 3), a determination is made that the accelerator pedal position range B and the rate of change α' were so great that a deviation from the base shift program should be made for the time duration $T_{A1}$. At time point $t_0$, the residual running time $T_{Rest}$ of this switchover is $T_{A1}$. If the vehicle now accelerates after the start-drive operation, then in FIG. 9, it can be seen that the time is reduced in a step-wise manner until it returns to the base shift program at time point $t_2$ (adaptation quantity BZ=N). In the trace shown by the broken line, an increase of the residual running time $T_{Rest}$ to the value $T_{F1}$ takes place at time point $t_1$. This comes about because, in the travel-operation evaluation (FIGS. 2 and 4), an adequately large accelerator pedal position change Δ and an adequately large accelerator pedal rate of change α' had been detected. In this way, the switchover to the power-optimized shift program is extended to time point $t_3$. If the travel-operation evaluation (not shown) supplies, for example, again a time duration $T_F$ before reaching time point $t_3$, then the adjustment of the power-optimized shift program is extended beyond the time point $t_3$.

Figure 8:
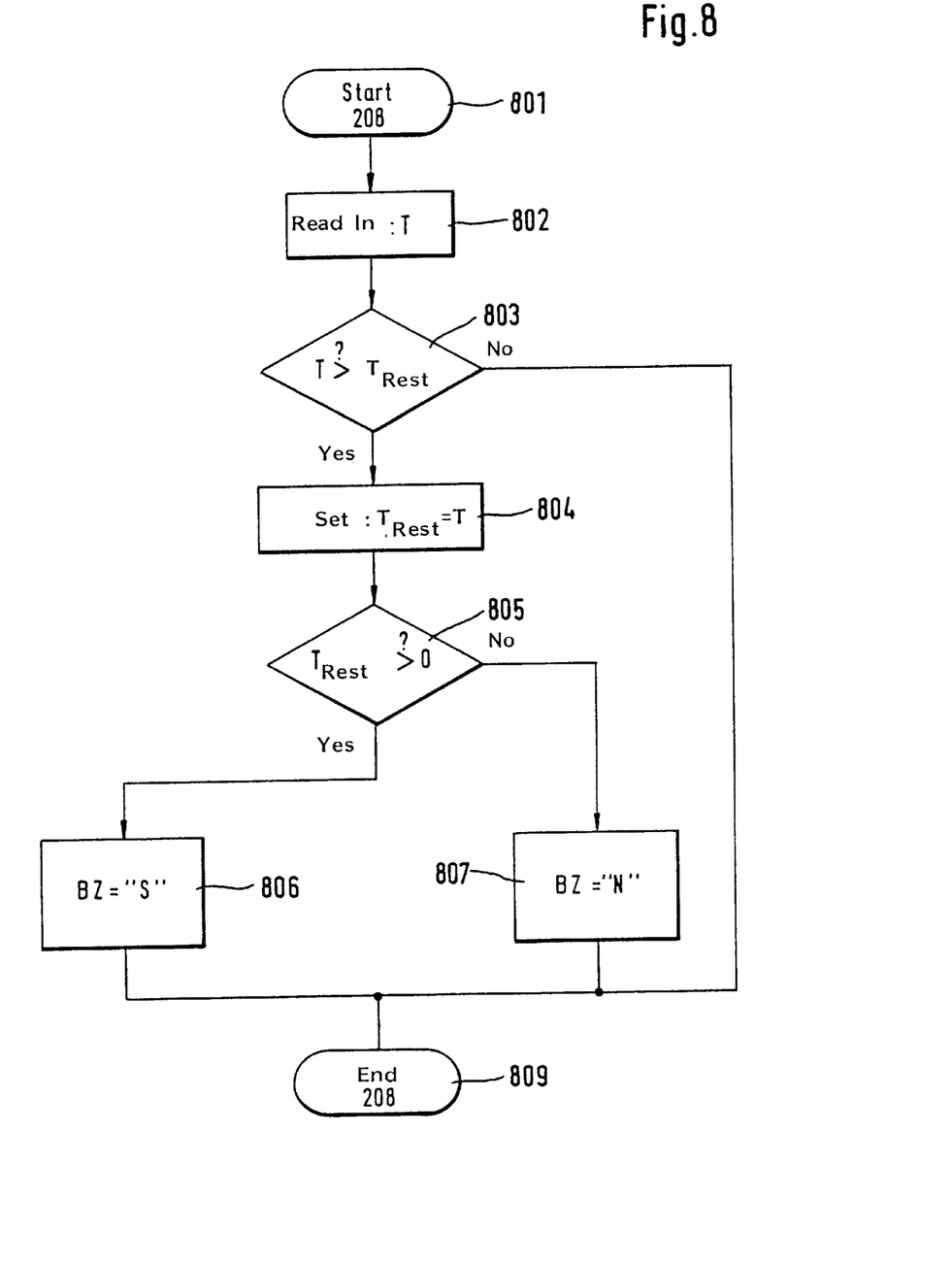
FIG. 8 is a sequence diagram showing the sequence of block 208 of FIG. 2.

The extension of the switchover described with respect to the time-dependent sequence in FIG. 9 will now be explained with respect to FIG. 8. FIG. 8 shows the sequence of step 208 (FIG. 2). After reaching step 208 (FIG. 2), and after the start step 801, the actual time duration T to be adjusted is read in. In step 803, this time duration T is compared, as required, to the residual running time $T_{Rest}$ which is still present. If the newly determined time duration T is less than the residual running time $T_{Rest}$, then there is a transition directly to the last step 809. However, If the time duration T which is to be set anew, exceeds the residual running time $T_{Rest}$, then the actual time duration T is set as the new residual running time $T_{Rest}$ in step 804.

In step 805, a check is made as to whether the residual running time $T_{Rest}$ exceeds the value zero. If this is the case, then the switchover to the power-optimized shift program is introduced or retained with the setting of the adaptation quantity BZ to the value S. If the residual running time has the value zero, then, in step 807, there is a switchback to the base shift program.

Figure 7:
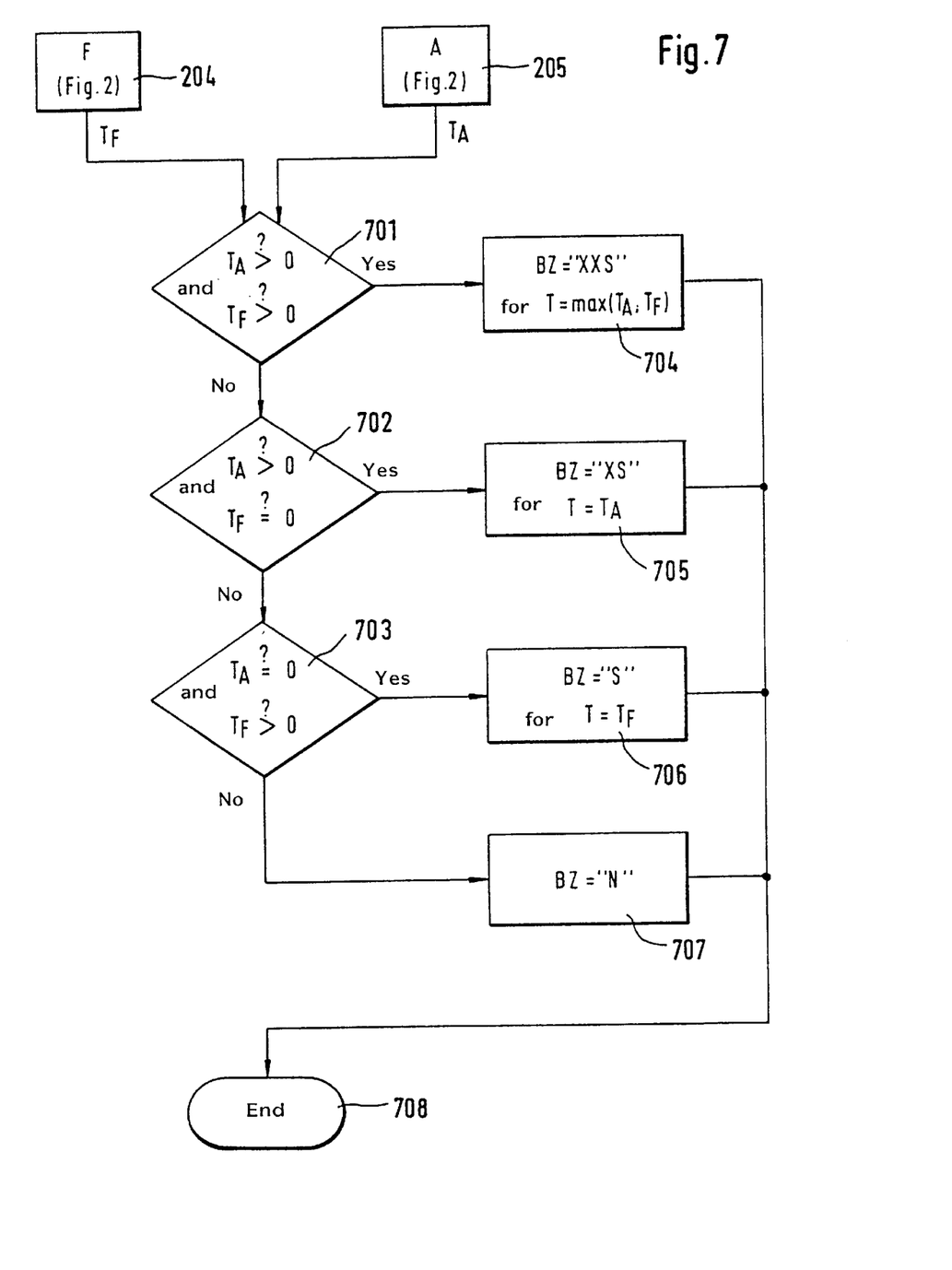
FIG. 7 is a sequence diagram showing the presence of several shift programs as an alternative to the base shift program.

The embodiment described above proceeded only from two shift programs in block 103. In contrast, FIG. 7 shows the presence of several shift programs as an alternative to the base shift program. After the time duration values $T_S$ and $T_F$ were determined in the start-drive evaluation 205 (FIG. 2) and in the travel-operation evaluation 204 (FIG. 2), respectively, an inquiry is made in step 701 as to whether the two time duration values are greater than zero. If this is the case, then in step 407, the adaptation quantity is so set that a highly power-oriented shift program (XXS, very high motor rpm) is set. This switchover takes place for the time duration $T_A$ or $T_F$ depending upon which time duration is greater. If not both time duration values exceed the value zero, then, in step 702, a check is made as to whether at least the time duration value $T_A$, which is determined by the start-drive evaluation, exceeds the value zero. If this is the case, then in step 705, a very power-oriented shift program (XS) is set for the time duration $T_A$. If the time duration $T_A$, which is determined by the start-drive evaluation, does not exceed the value zero, then, in step 703, a check is made as to whether the time duration $T_F$ exceeds the value zero. If this is the case, then in step 706, a power-oriented shift program (S) is set for the time duration $T_F$. If both time values are zero, then the base adjustment (N, block 707) is maintained. After the end step 708, the program sequence shown in FIG. 7 is started anew.

In this embodiment, the position of the accelerator pedal is given for the essential value for the selection of the shift programs. A signal can also be used which represents motor load, for example, the throttle flap position in a gasoline engine. The travel longitudinal speed can, for example, be determined by the transmission output rpm. The accelerator pedal evaluation or load evaluation supplies adequate information in order to make a decision as to which drive program best corresponds to the particular requirement of the driver. The two parts, namely, start-drive evaluation and travel-operation evaluation make possible a good applicability, namely a good adaptation to different types of vehicles. With the invention, and within a short time, the experienced applications engineer will be in a position to realize different transmission control philosophies.

It is understood that the foregoing description is that of the preferred embodiments of the invention and that various changes and modifications may be made thereto without departing from the spirit and scope of the invention as defined in the appended claims.

What is claimed is:

1. A system for determining gear ratio changes for an automatic transmission of a vehicle, the system comprising:

first detecting means for providing a first signal (V) representative of the road speed of the vehicle;

second detecting means for providing a second signal ($\alpha$) representing the position of the accelerator pedal actuated by the driver;

means for determining said gear ratio changes at least in dependence upon said first and second signals (V, $\alpha$) in such a manner that at least two differently predetermined shift programs can be selected with each shift program corresponding to a different association between said gear ratio changes and said first an second signals (V, $\alpha$) with a first one of said shift programs being a basic shift program (N) and the second one of said shift programs being an additional shift program (S); and, means for determining an adaptive quantity (BZ) which determines a movement out of said basic shift program into said additional shift program (S) for a predetermined time duration (T) whereafter there is an automatic jump back to said basic shift program (N).

2. The system of claim 1, wherein the selection can be made between said basic shift program (N) and at least two additional shift programs (XS, S) and each of said additional shift programs can be set for only a specific time duration (T).

3. The system of claim 1, wherein said time duration (T) is determined at least in dependence upon the rate of change ($\alpha'$) of said second signal.

4. The system of claim 1, wherein said time duration (T) is determined at least in dependence upon the position of said accelerator pedal represented by said second signal ($\alpha$).

5. The system of claim 4, wherein said time duration (T) is determined at least in dependence upon the change ($\Delta$) of said second signal ($\alpha$).

6. The system of claim 5, wherein the accelerator pedal position which can be set by the accelerator pedal is subdivided into individual ranges (B); and, said time duration (T) is at least dependent upon the range in which the position of the accelerator pedal is located.

7. The system of claim 6, wherein said time duration (T) is determined at least in dependence upon whether the position of said accelerator pedal changes in such a manner that a change in range occurs.

8. The system of claim 1, wherein said time duration (T) is determined at least in dependence upon said first signal (V).

9. The system of claim 1, wherein: to distinguish a start-drive state (A) and a travel-operation state (F), said first signal (V) is compared to a threshold value (SW1) to obtain a comparison result; and, the time duration (T) is determined differently depending upon the comparison result.

10. The system of claim 9, wherein a time duration for each of said states (A, F) is determined depending upon the detection of a start-drive state (A) or a travel-operation state (F); and, depending upon at least a comparison of the two time durations, one of the selectable additional associations (XXS, XS, S), a time duration (T), which is determined from the determined time durations, is set to be long.

11. The system of claim 2, wherein: as a base setting, a fuel consumption optimized transmission gear ratio program (shift program N) is set; and, a switchover to a more propulsion power optimal transmission gear ratio program (shift program XXS, XS, S) can take place for only a specific time duration (T); and, said switchover and said time duration (T) are determined in dependence upon the rate of change ($\alpha'$) of said second signal and upon the total change ($\Delta$) of said second signal.

12. The system of claim 1, wherein the selection can be made between said basic shift program (N) and at least three additional shift programs (XXS, XS, S) and each of said additional shift programs can be set for only a specific time duration (T).

13. The system of claim 1, wherein: to distinguish a start-drive state (A) and a travel-operation state (F), said first and second signals (V, $\alpha$) are compared to respective threshold values (SW1, SW2) to obtain comparison results and the time duration (T) is determined differently depending upon the comparison results.

14. The system of claim 1, wherein said time duration (T) is a function of at least one of said road speed, the position of an accelerator pedal of the vehicle and the rate of change of the position of the accelerator pedal.

* * * * *